United States Patent Office 2,716,655
Patented Aug. 30, 1955

2,716,655
DYES AND DYE INTERMEDIATES OF THE ANTHRAQUINONE SERIES

Samuel N. Boyd, Jr., Salem, N. J., assignor to E. I. du Pont de Nemours and Company, Wilmington, Del., a corporation of Delaware No Drawing. Application January 12, 1954, Serial No. 403,637

6 Claims. (Cl. 260—381)

This invention relates to dyes and dye intermediates of the anthraquinone series, and more particularly to compounds of the general formula:

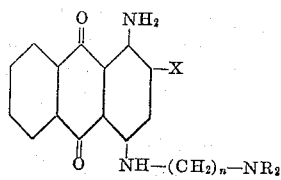

wherein X stands for a halogen of the group consisting of chlorine and bromine, R stands for an alkyl group of from 1 to 4 carbon atoms, and $n$ stands for an integer of the group consisting of 2 and 3, and their alkyl ammonium salts.

In the search for dyes for new fibers such as "Orlon" acrylic fiber, various 1,4-diaminoanthraquinone derivatives were tested. The 1-methylamino-4-substituted alkyl-aminoanthraquinones were found to be of inferior light fastness on this fiber, or they exhibited such a slow rate of dyeing that they could not be used satisfactorily in admixture with other dyes currently available for this new fiber. When one dye of a mixture dyes appreciably faster or slower than another dye in the mixture, it is difficult and often impossible to obtain uniform shades from such a mixture.

It is an object of the present invention to provide blue dyes of the anthraquinone series suitable for the dyeing of "Orlon" acrylic fiber and which can be used in admixture with other dyes, more particularly with yellow dyes in the production of greens, and which will exhibit good dyeing properties and show an affinity substantially equal to the other dyes available for that fiber. It is a further object of the invention to produce anthraquinone compounds which after quaternization, exhibit desirable light fastness and affinity on polyacrylonitrile fibers.

The compounds of the present invention are prepared from 1-amino-2,4-dihalogenanthraquinones in which the halogen may be either chlorine or bromine. The 1-amino-2,4-dihalogenanthraquinone is condensed with the dialkylaminoalkylamine usually in an organic solvent and in the presence of an acid binding agent. After isolation the product may be quaternized with short chain alkyl chlorides or bromides or the alkyl esters of organic sulfonic acids such as the methyl, ethyl, propyl or butyl ester of para-toluene sulfonic acid.

The following examples are given to illustrate the invention. The parts used are by weight.

Example 1

A mixture of 25 parts of 1-amino-2,4-dibromoanthraquinone and 100 parts of pyridine is heated until solution is complete. Then 0.25 part of copper-bronze, 25 parts of 3-dimethylaminopropylamine and 7.5 parts of potassium acetate are added and the mixture is stirred at reflux for from 3 to 8 hours. The mixture is allowed to cool and is diluted with 1500 parts of water to precipitate the product. The precipitate is isolated by filtration, stirred with 500 parts of water and 50 parts of glacial acetic acid, heated to 70° C. and filtered. The filtrate is cooled to from 15° to 20° C. and rendered slightly alkaline with sodium hydroxide. The precipitate is isolated by filtration, washed with water and dried. The resulting 1 - amino - 2 - bromo-4-(3-dimethylaminopropylamino)anthraquinone,

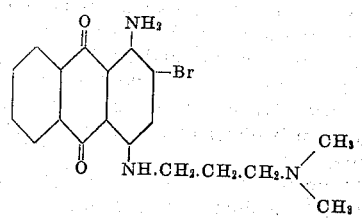

is a blue solid which dissolves in aqueous acid solutions with a blue coloration.

When the 1-amino-2,4-dibromoanthraquinone of this example is replaced by an equivalent amount of 1-amino-2-chloro-4-bromoanthraquinone, the corresponding 1-amino - 2-chloro - 4 - (3-dimethylaminopropylamino)anthraquinone is obtained which possesses similar properties to the 2-bromoanalogue. Also, the 1-amino-2,4-dichloroanthraquinone may be substituted to produce the same 2-chloro-analogue.

Example 2

The 1 - amino - 2 - bromo-4-(2-dimethylaminoethylamino)-anthraquinone may be prepared by replacing the 3-dimethylaminopropylamine of Example 1 with 21.8 parts of 2-dimethylaminoethylamine.

By condensing the 1-amino-2-chloro-4-bromoanthraquinone with 2-dimethylaminoethylamine in the same way, one obtains the 1-amino-2-chloro-4-(2-dimethylaminoethylamino)anthraquinone which has properties very similar to those of the 2-bromo-analogue.

Example 3

The 1 - amino-2-bromo-4-(2-diethylaminoethylamino)-anthraqninone may be prepared by replacing the 3-dimethylaminopropylamine in Example 1 with 28.5 parts of 2-diethylaminoethylamine.

Example 4

To a solution of 40.5 parts of 1-amino-2-bromo-4-(2-dimethylaminoethylamino)anthraquinone in 200 parts of "Cellosolve" (2-ethoxyethanol-1) is added 30.5 parts of dimethyl sulfate. The mixture is allowed to stand at the room temperature for 48 hours and then filtered. The solid material is washed with acetone and dried at 30° to 60° C. The resulting methyl[2-(1-amino-2-bromo-4-anthraquinonylamino)ethyl] trimethylammonium sulfate

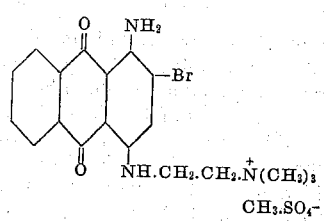

is a blue powder which dissolves readily in water to yield a blue solution.

The [2-(1-amino-2-bromo-4-anthraquinonylamino)-ethyl]-dimethylethylammonium bromide is prepared by the process of this example by replacing the dimethyl sulfate with 28 parts of ethyl bromide.

The [2-(1-amino-2-bromo-4- anthraquinonylamino)-ethyl]-benzyldimethylammonium chloride is prepared in the same way by replacing the dimethyl sulfate with 31 parts of benzyl chloride.

Example 5

To a solution of 42 parts of 1-amino-2-bromo-4-(3-dimethylaminopropylamino)anthraquinone in 200 parts of "Cellosolve" (2-ethoxyethanol-1) is added 25 parts of dimethyl sulfate. The mixture is allowed to stand at the room temperature for 48 hours and then is filtered. The solid material is washed with acetone, "Cellosolve," or n-butanol (50 to 75 parts) and dried at 30° to 60° C. The resulting methyl[3-(1-amino-2-bromo-4-anthraquinonylamino)propyl]trimethylammonium sulfate, is a blue powder which dissolves readily in water to yield a blue solution.

The [3-(1-amino-2-bromo-4-anthraquinonylamino)propyl]-trimethylammonium p-toluene sulfonate is prepared by the process of this example by replacing the dimethyl sulfate with 45 parts of methyl p-toluene sulfonate.

The [3-(1-amino-2-bromo-4-anthraquinonylamino)propyl]-dimethylethylammonium bromide is prepared in the same way by replacing the dimethyl sulfate with 28 parts of ethyl bromide.

The [3-(1-amino-2-bromo-4-anthraquinonylamino)propyl]-benzyldimethylammonium chloride is prepared by replacing the dimethyl sulfate with 31 parts of benzyl chloride.

The quaternization may be carried out in other suitable organic solvents, such as acetone, monochlorobenzene, nitrobenzene, isopropanol or n-butanol. Similarly, the time required for complete quaternization may be diminished by raising the temperature of the reaction to 50°–100° C. In "Cellosolve" at from 50° to 60° C., the reaction of the tertiary amino anthraquinone derivative with dimethyl sulfate is essentially complete in from 1 to 2 hours. Reactions with ethyl bromide (boiling point 38.4° C.) are best carried out below 40° C., or at the higher temperature in pressure equipment.

Example 6

A solution of 43.5 parts of 1-amino-2-bromo-4-(2-diethylaminoethylamino)anthraquinone in 200 parts of "Cellosolve" (2-ethoxyethanol-1) is stirred at from 50° to 60° C. and 25 parts of dimethyl sulfate is added slowly over a period of from 1 to 2 hours. The mixture is filtered hot and the filter cake is washed with from 100 to 200 parts of "Cellosolve" previously heated to 60° C. After drying at 60° C., the product, methyl[2-(1-amino-2-bromo-4-anthraquinonylamino)ethyl]diethylmethylammonium sulfate, is a blue powder which dissolves readily in water to yield a blue solution.

In a similar manner, [2-(1-amino-2-bromo-4-anthraquinonylamino)ethyl]benzyldiethylammonium chloride is prepared by replacing the dimethyl sulfate of this example with 31 parts of benzyl chloride.

Example 7

A mixture of 156.6 parts of n-butanol, 24.5 parts of 3-dimethylaminopropylamine, 0.8 part of cupric acetate and 13.5 parts of potassium acetate is heated, while stirring, to 80° C. 52.2 parts of 1-amino-2,4-dibromoanthraquinone is added in portions over a period of from 0.5 to 1 hour, and the resulting mixture is stirred at from 88° to 92° C. for 12 hours. The mixture is filtered at 90° C. and the solid cake is washed with 52.2 parts of n-butanol at from 75° to 80° C. The combined wash-liquor and filtrate is stirred at 55° to 60° C. and 30.8 parts of dimethyl sulfate added slowly over a period of from 1 to 2 hours at temperatures of from 55° to 65° C. The product is isolated by filtration and washed with 156.6 parts of n-butanol previously heated to 60° C. The product obtained is the same as that of Example 5 and is a dark blue powder which dissolves readily in water to produce a blue solution.

In a similar manner, the condensation and quaternization reactions may be carried out in monochlorobenzene, "Cellosolve" (2-ethoxyethanol-1), or nitrobenzene.

Example 8

A mixture of 65 parts of n-butanol, 0.3 part of cupric acetate monohydrate, 7.0 parts of potassium acetate and 11.5 parts of 3-dimethylaminopropylamine is heated to 80°–85° C. To the stirred mixture is added 20.0 parts of 1-amino-2,4-dichloroanthraquinone over a period of 15 minutes. The mixture is kept at 90°±2° C. for 12 hours and then filtered. To the filtrate heated at 60°–65° C. is added 14.0 parts of dimethyl sulfate over a period of one hour. The mixture is held at 60°–65° C. for one and three-quarter hours and filtered. The product is washed with 65 parts of warm (60° C.) n-butanol and then several times with small portions of nitrobenzene followed by washing with diethyl ether and drying. The product thus obtained, methyl[3-(1-amino-2-chloro-4-anthraquinonylamino)propyl]trimethylammonium sulfate, is a dark blue powder soluble in water.

The quaternized ammonium salts of the above examples all have good affinity for "Orlon" polyacrylonitrile fibers and dye it in desirable blue shades. All of these compounds exhibit excellent light, sublimation and wash fastness. These dyes are water soluble and are applied to the polyacrylonitrile fibers in water solutions, preferably at the boil. No additions are necessary, although cationic surface active agents may be employed.

The dyes may be applied from neutral, acid or slightly alkaline solutions, and preferably at pH's of 3 to 8. This permits the dyeing of these colors on mixed goods where viscose or wool is employed in conjunction with the polyacrylonitrile fibers. When dyeing mixed goods, containing wool, from acid solutions, there is no appreciable staining of the wool. When dyeing union fabrics of viscose—"Orlon" fibers, they may be dyed from slightly acid, neutral or alkaline baths, in which case the viscose is essentially unstained.

These dyes are applicable to the polyacrylonitrile fibers made from either the homopolymers or copolymers defined in the art which are predominantly produced from acrylonitrile—see, for instance, U. S. Patent 2,436,926.

Other aryl substituted aliphatic halides such as p-CH₃—C₆H₄—CH₂Cl and C₆H₅—CH₂—CH₂Cl or their Br analogues may be used in place of the benzyl chloride in the above examples. Other short chain alkyl sulfates such as diethyl sulfate, dipropyl sulfate and dibutyl sulfate, or other short chain chlorides or bromides, may be used as quaternizing agents.

The examples listed disclose four anions, e. g., chloride, bromide, methyl sulfate and p-toluene sulfonate. From numerous tests it appears that the dyeing of "Orlon" fiber with these quaternized compounds occurs by an ion-exchange mechanism. The dye cation displaces a sodium ion or hydrogen ion associated with a sulfonate or sulfate anion present as a polymer end-group in the fiber. Thus the anion associated with the cationic dye plays no important role in the dyeing process. Any anion therefore may be used as long as it does not render the cationic dye insoluble in the dye bath. The nature of the anion associated with the dye cation may be altered by the known metathetical or "double decomposition" reactions, according to the law of mass action.

The dye bases or intermediates, as more particularly illustrated in Examples 1 to 3 inclusive, dye the polyacrylonitrile fibers in much weaker shades, and the light fastness does not compare with the dyeings produced from the quaternized forms. These dyes, being water insoluble, are applied to the fiber as aqueous dispersions, or as the so-called solubilized dyes are applied to cellulose acetate fibers.

I claim:

1. The compounds of the general formula:

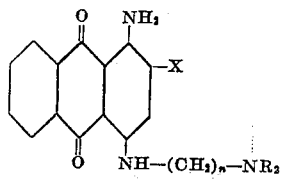

wherein X stands for a halogen of the group consisting of chlorine and bromine, R stands for an alkyl group of from 1 to 4 carbon atoms, and $n$ stands for an integer of the group consisting of 2 and 3, and their alkyl ammonium salts.

2. 1-amino-2-bromo-4-(3-dimethylaminopropylamino)-anthraquinone.

3. 1-amino-2-bromo-4-(2-dimethylaminoethylamino)-anthraquinone.

4. 1-amino-2-bromo-4-(2-diethylaminoethylamino)-anthraquinone.

5. 1-amino-2-chloro-4-(3-dimethylaminopropylamino)-anthraquinone.

6. Methyl[3-(1-amino-2-bromo-4-anthraquinonyl-amino)-propyl] trimethylammonium sulfate.

References Cited in the file of this patent

UNITED STATES PATENTS 2,321,767    Ogilvie _____ June 15, 1943

FOREIGN PATENTS 714,986    Germany _____ Dec. 11, 1941